US012450954B2

(12) United States Patent
Ogawa et al.

(10) Patent No.: US 12,450,954 B2
(45) Date of Patent: Oct. 21, 2025

(54) DATA COLLECTION DEVICE AND METHOD (71) Applicant: TOYOTA JIDOSHA KABUSHIKI KAISHA, Toyota (JP)

(72) Inventors: Yohei Ogawa, Toyota (JP); Jun Tahara, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 269 days.

(21) Appl. No.: 18/332,946

(22) Filed: Jun. 12, 2023

(65) Prior Publication Data

US 2023/0410566 A1 Dec. 21, 2023

(30) Foreign Application Priority Data

Jun. 16, 2022 (JP) .................. 2022-097158

(51) Int. Cl.
G07C 5/00 (2006.01)
G07C 5/08 (2006.01)

(52) U.S. Cl.
CPC ........... G07C 5/008 (2013.01); G07C 5/0808 (2013.01)

(58) Field of Classification Search
None
See application file for complete search history.

(56) References Cited

U.S. PATENT DOCUMENTS

| | | | | |
|---|---|---|---|---|
| 9,922,567 | B2* | 3/2018 | Molin | G08G 1/20 |
| 2011/0260884 | A1* | 10/2011 | Yi | G07C 5/008 |
| | | | | 340/870.02 |
| 2019/0268360 | A1* | 8/2019 | Yamanashi | H04L 67/12 |
| 2020/0074761 | A1 | 3/2020 | Tsuyunashi | |

FOREIGN PATENT DOCUMENTS

| | | |
|---|---|---|
| JP | 2012190202 A | 10/2012 |
| JP | 2018-055191 A | 4/2018 |
| JP | 2020038407 A | 3/2020 |

* cited by examiner

*Primary Examiner* — Farley Abad
*Assistant Examiner* — Dayton Lewis-Taylor
(74) *Attorney, Agent, or Firm* — Dinsmore & Shohl LLP (57) ABSTRACT

A data collection device of the present disclosure is mounted on a vehicle and collects data on a state of the vehicle. The device acquires an aggregation format of the data from an external device and aggregates the data collected from the vehicle to generate an aggregation result in the aggregation format specified by the external device. The device sends the aggregation result to the external device. The device enables useful information to be provided from the vehicle to the external device according to needs of the external device while reducing a communication load and a processing burden of the external device.

4 Claims, 4 Drawing Sheets

| AGGREGATION ID | VARIABLE 1 | VARIABLE 2 | X axis INFO. | Y axis INFO. | PRECONDITIONS | COMPUTING CYCLE | INCIDENTAL INFO. |
|---|---|---|---|---|---|---|---|
| 01 | ... | ... | ... | ... | ... | ... | ... |
| 02 | ... | ... | ... | ... | ... | ... | ... |
| 03 | ... | ... | ... | ... | ... | ... | ... |
| 04 | ... | ... | ... | ... | ... | ... | ... |
| ⋮ | | | | | | | |
| ZZ | ... | ... | ... | ... | ... | ... | ... |

| AGGREGATION FORMAT | | |
|---|---|---|
| 2-D FREQUENCY DISTRIBUTION | DATA ID OF VARIABLE 1 (X axis): ··· | |
| | ATTRIBUTE | ··· |
| | FRAME ID | ··· |
| | FIRST ADDRESS | ··· |
| | DATA LENGTH | ··· |
| | DATA ID OF VARIABLE 2 (Y axis): ··· | |
| | ATTRIBUTE | ··· |
| | FRAME ID | ··· |
| | FIRST ADDRESS | ··· |
| | DATA LENGTH | ··· |
| | X AXIS UPPER LIMIT | ··· |
| | X AXIS LOWER LIMIT | ··· |
| | X AXIS SCALE | ··· |
| | Y AXIS UPPER LIMIT | ··· |
| | Y AXIS LOWER LIMIT | ··· |
| | Y AXIS SCALE | ··· |
| | DATA ID OF CONDITION VARIABLE 1: ··· | |
| | ATTRIBUTE | ··· |
| | FRAME ID | ··· |
| | FIRST ADDRESS | ··· |
| | DATA LENGTH | ··· |
| | DATA ID OF CONDITION VARIABLE 2: ··· | |
| | ATTRIBUTE | ··· |
| | FRAME ID | ··· |
| | FIRST ADDRESS | ··· |
| | DATA LENGTH | ··· |
| | EQUAL/INEQUAL 1 | ··· |
| | EQUAL/INEQUAL 2 | ··· |
| | TYPE OF CONDITION ESTABLISH | ··· |
| | COMPUTING CYCLE | ··· |
| | INCIDENTAL INFO. | ··· |

FIG. 5

DATA COLLECTION DEVICE AND METHOD

CROSS-REFERENCE TO RELATED APPLICATION

The present disclosure claims priority to Japanese Patent Application No. 2022-097158 filed, Jun. 16, 2022, which is incorporated herein by reference in its entirety including specification, drawings and claims.

TECHNICAL FIELD

The present disclosure relates to a data collection device and a data collection method that collect data on a state of a vehicle.

BACKGROUND

A conventionally known data collection device accepts a data collection request from a terminal (external device) of a user such as a service provider, a developer, and a driver and collects data from in-vehicle devices based on the accepted collection request to provide the collected data for the user (as described in, for example, Japanese Patent Application Laid Open No. 2020-038407). The data collection device includes an acceptance module that accepts the collection request including a collection condition for target data to be collected from the user; a selection module that selects a vehicle that meets the collection condition accepted by the acceptance module; a sorting request sending module that sends a sorting request for a specified data type based on the collection condition to an in-vehicle device of the vehicle selected by the selection unit; and a sending request sending module that sends a sending request for data selected based on the sorting request. The in-vehicle device selected by the data collection device sorts the data type that satisfies the collection condition based on the sorting request from the data collection device, or starts recording the data of the data type specified by the sorting request. Then, the in-vehicle device sends the sorted data to the data collection device in response to the sending request from the data collection server.

SUMMARY

The user of the conventional data collection device may specify information on the data type, information on the vehicle to be collected, a collection period, an upper limit of a collection amount, a collection area and the like as the collection condition in the collection request. However, the data sent from the in-vehicle device to the data collection device include actual data acquired by a sensor, a camera or the like connected to the in-vehicle device and index data (tag information) of the corresponding actual data. This makes it difficult to secure the amount of information while suppressing an increase in a volume of data, and excessively increases a communication load between the data collection device and the in-vehicle device. In addition, when utilizing the actual data from the in-vehicle device, it is necessary to perform some processing on the data on the side of the in-vehicle device, resulting in an excessive processing load on the in-vehicle device.

A main object of the present disclosure is to provide useful information from the vehicle to the external device according to needs of the external device while reducing a communication load and a processing burden of the external device.

A data collection device of the present disclosure is mounted on a vehicle and collects data on a state of the vehicle. The data collection device is programmed to acquire an aggregation format of the data from an external device and aggregates the data collected from the vehicle to generate an aggregation result in the aggregation format specified by the external device. The data collection device is programmed to send the aggregation result to the external device.

A data collection method of the present disclosure collects data on a state of a vehicle. The method includes: sending an aggregation format of the data from an external device to the vehicle; aggregating the data collected from the vehicle on the vehicle side to generate an aggregation result in the aggregation format specified by the external device; and sending the aggregation result from the vehicle to the external device.

The data collection device and method of the present disclosure enable useful information to be provided from the vehicle to the external device according to needs of the external device while reducing a communication load and a processing burden of the external device.

DESCRIPTION OF EMBODIMENTS

The following describes some aspects of the present disclosure with reference to drawings.

Figure 1:
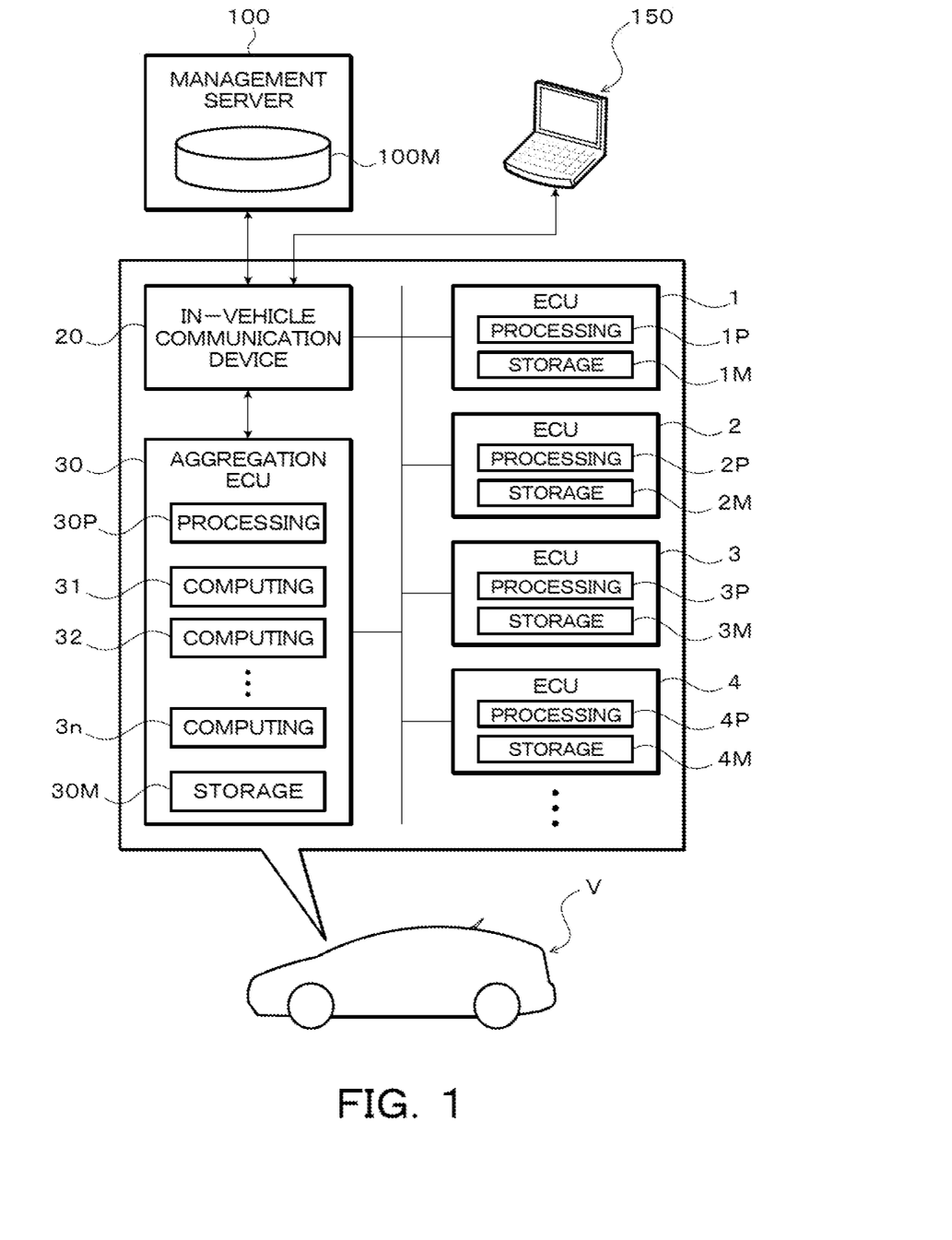
FIG. 1 is a schematic configuration diagram showing a vehicle including a data collection device of the present disclosure.

FIG. 1 is a schematic configuration diagram showing a vehicle V including the data collection device of the present disclosure. The vehicle V shown in FIG. 1 is, for example, a hybrid electric vehicle including an engine (internal combustion engine), a motor generator, an inverter, a battery and the like, all of which are not shown. As shown in FIG. 1, the vehicle V includes a plurality of electronic control units (hereinafter referred to as "ECUs") 1, 2, 3, 4, an in-vehicle communicating device 20, and an aggregating electronic control unit (hereinafter referred to as "aggregation ECU") 30 that works as the data collection device of the present disclosure.

The ECUs 1, 2, 3, 4, . . . , include a microcomputer (not shown) with CPU, ROM, RAM, I/O interfaces and the like, and a storage device 1M, 2M, 3M, 4M, . . . , such as a non-volatile memory (NVRAM). In this embodiment, the ECU 1 comprehensively controls the entire vehicle. The ECU 2 controls the engine of the vehicle V. The ECU 3 controls an inverter and the like that drives the motor generator of the vehicle V. The ECU 4 manages the battery of the vehicle V.

The in-vehicle communication device 20 exchanges various information with external devices such as the management server 100 shown in FIG. 1 and a terminal 150 (including a mobile terminal) in a vehicle dealer or a vehicle maintenance factory through wireless or wired high-speed data communication (packet communication). The aggregation ECU 30 includes a microcomputer (not shown) with CPU, ROM, RAM and I/O interface (not shown), and a storage device 30M such as a non-volatile memory (NVRAM). The aggregation ECU 30 aggregates time-series data based on data acquired by each of the ECUs 1, 2, 3, 4, . . . to generate a plurality of aggregate results.

Figure 2:
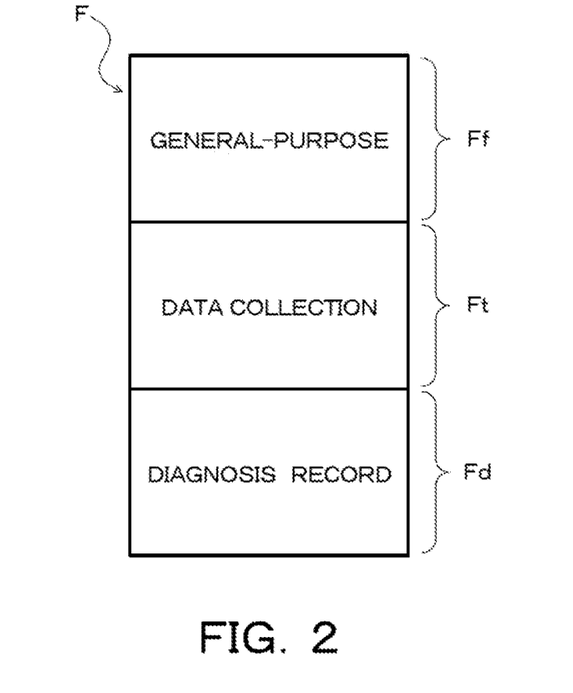
FIG. 2 is an explanatory view exemplifying a communication frame used in the data collection device of the present disclosure.

These ECUs 1, 2, 3, 4, . . . , in-vehicle communication devices 20 and the aggregation ECU 30 are connected to shared communication lines of the vehicle V, which is a CAN bus including two communication lines (wire harnesses) of Lo and Hi. The ECUs 1, 2, 3, 4, . . . in-vehicle communication devices and the aggregation ECU 30 mutually exchange information (communication frame) through a CAN communication via the shared communication lines. In this embodiment, as shown in FIG. 2, a flame F of the CAN communication includes a data collection frame Ft in which data are stored by the ECUs 1, 2, 3, 4, . . . , a diagnosis record frame Fd in which data for a vehicle diagnosis and the like are stored mainly by the ECUs 1, 2, 3, 4, . . . , and a general-purpose frame Ff in which arbitrary data are stored.

As shown in FIG. 1, each of the ECUs 1, 2, 3, 4, . . . includes data processing modules 1P, 2P, 3P, 4P, constructed through cooperation with programs (software) installed therein and hardware such as CPU, ROM, RAM and the like. The data processing modules 1P, 2P, 3P, 4P, respectively acquire (detect or calculate) a plurality of data on a state of vehicle V assigned thereto (physical quantities and settings such as a vehicle speed, an engine speed, a motor speed, and the like) at a predetermined sampling interval (for example, several milliseconds to several tens of milliseconds). Further, the data processing modules 1P, 2P, 3P, 4P, . . . store the acquired data at predetermined timing in the data collection frame Ft, the diagnosis record frame Fd or the general-purpose frame Ff of the frame F of the CAN communication. In addition, data processing modules 1P, 2P, 3P, 4P, . . . acquire a plurality of data concerning the state of vehicle V assigned to each of them at a reference sampling interval (for example, 500 milliseconds) longer than the above predetermined sampling interval, and store the acquired data as data for the vehicle diagnosis in the diagnosis record frame Fd of the frame F of the CAN communication.

As shown in FIG. 1, the aggregation ECU 30 includes an aggregation processing module 30P and a plurality of computing modules 31, 32, . . . 3n respectively constructed through cooperation with programs (software) installed therein and hardware such as CPU, ROM, RAM and the like. The aggregation processing module 30P of the aggregation ECU receives (acquires) data stored by the ECUs 1, 2, 3, 4, . . . from the data collection frames Ft and the like of the frame F of the CAN communication and stores the data as time-series data (historical information) in the storage device 30M. Further, the aggregation processing module 30P receives (acquires) data stored by ECUs 1, 2, 3, 4, from the diagnosis record frame Fd of the frame F of the CAN communication and stores the data in the storage device 30M as time-series data for the vehicle diagnosis. In addition, the aggregation processing module 30P cooperates with the plurality of computing modules 31, 32, . . . to aggregate time-series data based on the data acquired from the ECUs 1, 2, 3, 4, . . . .

The computing modules 31, 32, . . . of the aggregation ECU 30 execute their corresponding computing programs (general-purpose logic) to aggregate time-series data based on data from the ECUs 1, 2, 3, 3, 4, and generate aggregation results in different aggregation formats that differ from each other. In this embodiment, the aggregation formats of time-series data in the calculation modules 31, 32, . . . include a maximum value, a minimum value, an average value, an integrated value, a one-dimensional frequency distribution, a two-dimensional frequency distribution and the like. That is, the computing modules 31, 32, . . . extract or calculate the maximum value, the minimum value, the average value or the integrated value of specified data (for example, physical quantity such as the engine speed) under specified conditions to output them as aggregate results, or create the one-dimensional or the two-dimensional frequency distributions of one or two specified data under specified conditions as aggregate results.

Figure 3:
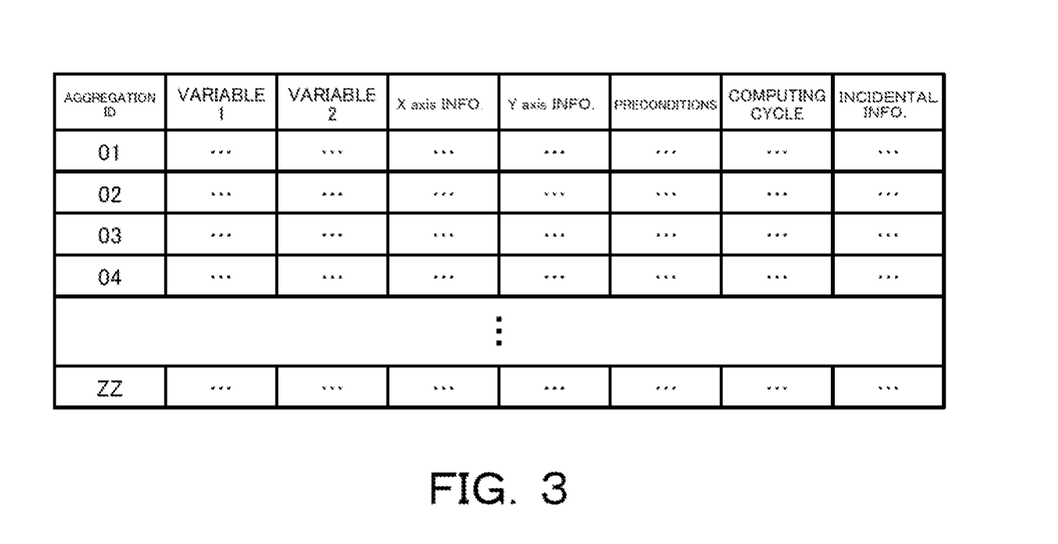
FIG. 3 is an explanatory view exemplifying a plurality of aggregation conditions used in the data collection device of the present disclosure.

The storage device 30M of the aggregation ECU 30 stores a plurality of aggregation conditions (data sets) exemplified in FIG. 3, which are respectively linked to the corresponding aggregation format. The aggregation conditions shown in FIG. 3 are respectively predetermined to obtain the desired aggregation result, and are stored in the storage device 30M at the manufacturing stage of the vehicle V, for example. As shown in FIG. 3, the aggregation conditions respectively include data IDs and attributes defined in the vehicle V for variables (aggregation items) in the aggregation, an aggregation axis information, a computing cycle (aggregation cycle), preconditions for the aggregation, and an incidental information.

The variables (aggregation items) in the aggregation are selected from among a number of physical quantities such as the vehicle speed, the engine speed, and the motor speed, and a number of setting states. The attributes of the variables are selected from among a raw value, an extreme value, an average value and the like. The aggregation axis information includes upper and lower limits of vertical (X-axis) and horizontal (Y-axis) axes, scale intervals and the like. The computing cycle indicates, for example, a cycle of plotting values on X-Y coordinates. The preconditions specify, for example, a range of vehicle speeds and a range of temperatures in the aggregation, and include at least one condition variable, an equal sign and an inequality sign indicating a size relation between condition variables and the like, and a relationship between the preconditions ("AND", "OR", and the like). The incidental information is, for example, any information related to the aggregation process, that including times, the vehicle speed and a travel distance to start/terminate the aggregation and the like.

Further, an aggregation ID as an identifier is assigned to each of the aggregation conditions. In this embodiment, the aggregation ID is a number assigned to each of the aggregation conditions. The aggregation IDs are divided into a plurality of groups that respectively include a blank number in the order of the number. Each group of aggregation IDs is assigned (linked) to one aggregation format. For example, "two-dimensional frequency distribution" is assigned to the group of the aggregation IDs numbered from n to n+α. Thus, each of the aggregation conditions is linked to the corresponding aggregation format. The aggregation conditions are not limited to those illustrated in FIG. 3, but may be defined arbitrarily according to the aggregation format and the like.

Figure 4:
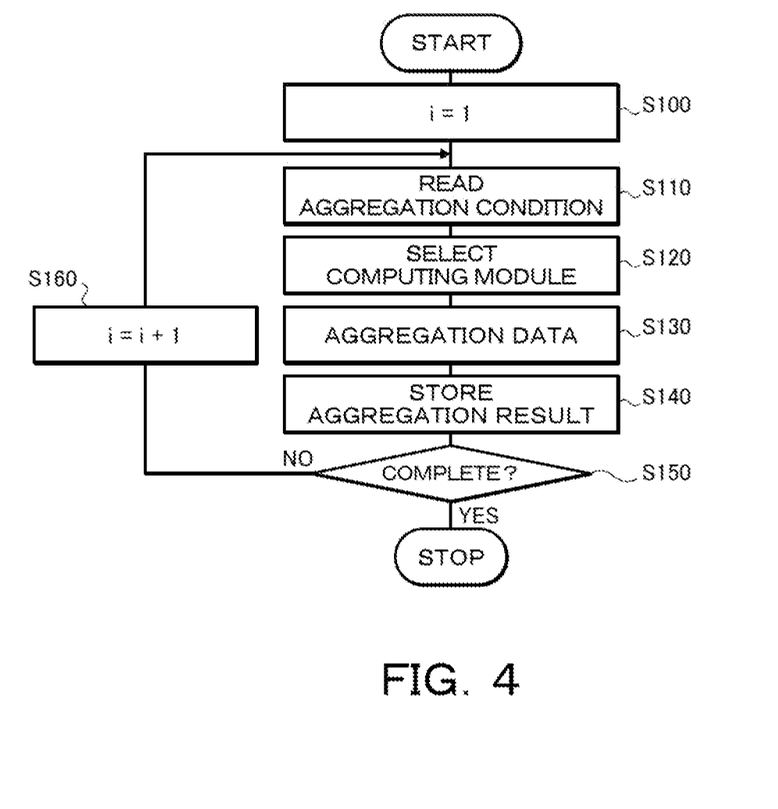
FIG. 4 is a flowchart showing one example of a data collection routine executed by the data collection device of the present disclosure.

Next, the data aggregation procedure by the aggregation ECU 30 is explained with reference to FIG. 4. FIG. 4 is a flowchart showing a data aggregation routine executed by the aggregation ECU 30, that is, the aggregation processing module 30P and the computing modules 31, 32, . . . at predetermined timings.

When the timing for execution of the data aggregation routine arrives, the aggregation processing module 30P of the aggregation ECU 30 sets a repetition variable i to "1" (step S100), and reads the aggregation condition with the first or smallest aggregation ID from the storage device 30M to expand it in RAM (step S110). Further, the aggregation processing module 30P selects one of the computing modules 31, 32, . . . , that is linked to the aggregation ID (number) of the aggregation condition read out in step S110 (step S120), and instructs any one of the selected computing modules 31, 32, . . . to execute the data aggregation.

Any one of the computing modules 31, 32, . . . reads from the storage device 30M data (variables) specified by the aggregation condition read out in step S110, and generates the aggregation result in the aggregation format linked to the aggregation ID in accordance with the aggregation condition (step S130). Once the aggregation result is generated by any one of the computing modules 31, 32, . . . , the aggregation processing module 30P stores the generated aggregation result in the storage device 30M (step S140). Further, the aggregation processing module 30P determines whether or not the aggregation for all the aggregation conditions stored in the storage device 30M is complete (step S150).

When the aggregation for all the aggregation conditions is not completed (step S150: NO), the aggregation processing module 30P increments the repetition variable i (step S160) and executes processes of steps S110-S150. When the aggregation for all the aggregation conditions is completed (step S150: YES), the aggregation processing module 30P terminates the data aggregation routine in FIG. 4. Note that the routine of FIG. 4 may be modified such that steps S110, S120, S130 and S140, are respectively executed for all the aggregation IDs in sequence.

As with the time-series data for vehicle diagnostics, the aggregation results of the time-series data generated by the execution of the data aggregation routine in FIG. 4 are sent from the aggregation ECU 30 to the in-vehicle communication device 20 in response to a sending request from the management server 100 or in a predetermined cycle, for example. This makes it possible to greatly reduce a volume of data of information sent from the vehicle V (in-vehicle communication device 20) to the management server 100, compared to the case where the time-series data for obtaining the aggregation result are sent from the vehicle V (aggregation ECU 30) to the management server 100. Further, the management server 100 device does not need to aggregate the data from the vehicle V (aggregation ECU 30), and the aggregation result can basically be utilized as it is.

On the other hand, the management server 100 is installed and managed, for example, by a vehicle manufacturer that manufactures the vehicle V. The management server 100 includes a computer with CPU, ROM, RAM, I/O interfaces and the like, a communication module for communicating with the in-vehicle communication device 20 of the vehicle V and the like, and a storage device 100M for storing various information. The management server 100 stores time-series data for the vehicle diagnosis sent from a number of vehicles including the vehicle V and the aggregate results of the above time-series data in the storage device 100M while linking them to vehicle information such as a vehicle number, a chassis number and like of the vehicle V. Further, developers of the above vehicle manufacturer and persons in charge at vehicle dealerships or maintenance shops are capable of accessing the management server 100 via their own terminals and the like and viewing or downloading the time-series data for the vehicle diagnosis and the aggregate results managed by the management server 100. This makes it possible to use the information managed by the management server 100 for the development of new vehicles, market research, analysis of the causes of abnormalities that occur in vehicles, and the like.

Here, it is required to secure as much actual measurement data as possible for the development of new vehicles, the market research, and the analysis of the causes of abnormalities that occur in vehicles. However, if the aggregation conditions stored in the storage device 30M of the aggregation ECU 30 are only those prepared at a manufacturing stage of the vehicle V, the developer and the like may not obtain the desired aggregation results from the vehicle V side. Based on this, the management server 100 is configured to accept an acquisition request for a new aggregation result from developers and the like and to notify the vehicle V side of a new aggregation condition and a new aggregation format in response to the acquisition request of developer and the like. Further, the vehicle V is configured such that the aggregation ECU 30 aggregates time-series data in accordance with the new aggregation conditions and the new aggregation format notified by the management server 100.

Figure 5:
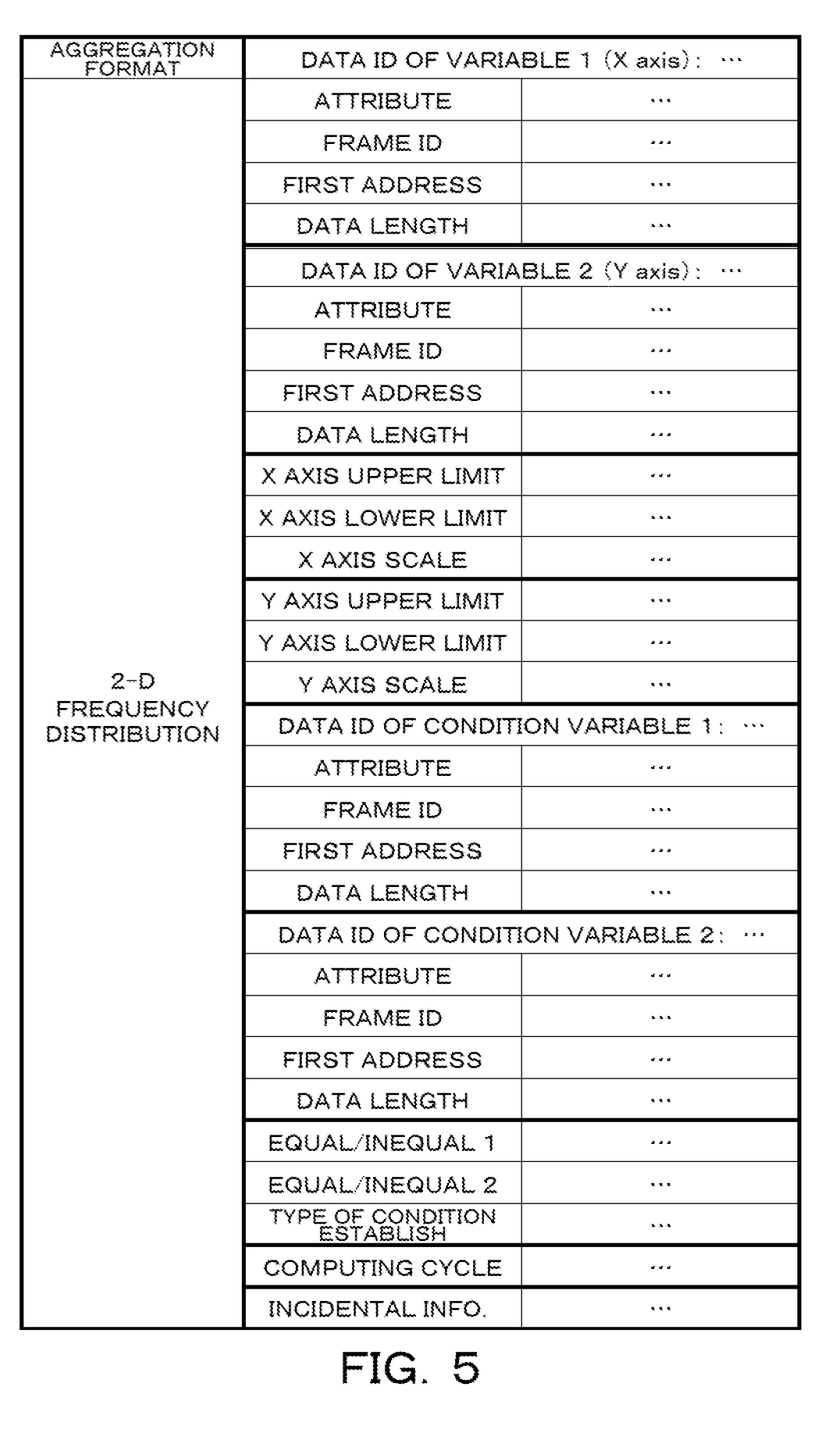
FIG. 5 is an explanatory view exemplifying a new aggregation condition table acquired from an external device by the data collection device of the present disclosure.

In this embodiment, the storage device 100M of the management server 100 stores information on data processing by ECUs and in-vehicle data communication for each type of vehicle in advance. When the management server 100 receives the acquisition request for the new aggregation result of vehicle V from the developer and the like, the management server 100 refers to the information stored in the storage device 100M to create a new aggregation condition table as shown in FIG. 5 and sends the created new aggregation condition table to the in-vehicle communication device 20 of the vehicle V. The new aggregation condition links the aggregation condition for obtaining the new aggregation result requested by the developer and the like to the aggregation format of the new aggregation result.

As shown in FIG. 5, the new aggregation condition table created by the management server 100 also includes variables (aggregation items) in the aggregation, attributes of the variables, an aggregation axis information, a computing cycle (aggregation cycle), and preconditions for the aggregation, and an incidental information. In the new aggregation condition table, the management server 100 specifies the data IDs of variables (variables 1 and 2 in FIG. 5) that are aggregation items, the data IDs of preconditions (condition variables 1 and 2 in FIG. 5), the ID of the data collection frame Ft, the diagnosis record frame Fd or the general-purpose frame Ff in which the data corresponding to the data ID should be stored, the address (first address) in the data collection frame Ft, the diagnosis frame Fd or general-purpose frame Ff in which the relevant data should be stored, and the data length.

In designation columns of the conditional variables that define the variables or the aggregation items and the preconditions in the new aggregation condition table, the addresses of the storage devices 1M, 2M, 3M, 4M, . . . in which the data corresponding to the data ID are stored may be described instead of the data ID. The new aggregation condition table is not limited to the example shown in FIG. 5, but may be defined arbitrarily within a range that can be handled on the vehicle V side.

When the in-vehicle communication device 20 of vehicle V receives the new aggregation condition table from the management server 100, the device 20 sends the received new aggregation condition table to the to the aggregation ECU 30. Furthermore, if necessary, the in-vehicle communication device 20 executes a process to store the data corresponding to the variable or the condition variable specified by the new aggregation condition table in the general-purpose frame Ff of the CAN communication. This enables data that had not previously been provided (sent) to the aggregation ECU 30 to be stored in the frame F of the CAN communication by the ECUs 1, 2, 3, 4, . . . .

The aggregation processing module 30P of the aggregation ECU 30 assigns the aggregation ID (for example, the smallest blank number in a number range of the specified aggregation format) to the new aggregation condition defined by the new aggregation condition table received from the in-vehicle communication device 20, and links the new aggregation condition to the aggregation format to store them in the storage device 30M. Further, the aggregation processing module 30P acquires (receives) the data stored by ECUs 1, 2, 3, 4, . . . from the data collection frames Ft, the diagnosis record frame Fd and the general-purpose frame Ff of the frame F of the CAN communication, and stored the data in the storage device 30M as time-series data (historical information). When the data aggregation routine shown in FIG. 4 is executed by aggregation ECU 30 after the new aggregation condition table from the management server 100 is received by the in-vehicle communication device 20, the aggregation ECU 30 generates the aggregation result corresponding to the new aggregation condition specified by the new aggregation condition table, that is, the aggregation result in the aggregation format specified by the management server 100 in addition to the aggregation results corresponding to the existing aggregation conditions.

As described above, when the new aggregation condition table is sent from the management server 100 that is the external device to the in-vehicle communication device the aggregation ECU 30 as the data collection device aggregates the time-series data collected from the vehicle V to generate the aggregation result in the aggregation format specified by the management server 100 and sends the aggregation result to the management server 100 via the in-vehicle communication device 20. This makes it possible to greatly reduce a volume of data of information sent from the vehicle V (in-vehicle communication device 20) to the management server 100, compared to the case where the data for obtaining the aggregation result are sent from the vehicle V to the management server 100. Further, the management server 100 does not need to aggregate the data from the vehicle V (aggregation ECU 30), and the aggregation result corresponding to the new aggregation condition table can basically be utilized as it is. As a result, the aggregation ECU 30 mounted on the vehicle V enables useful information to be provided from the vehicle V to the management server 100 according to needs of the management server 100 (developers and the like) while reducing a communication load and a processing burden of the management server 100.

In the above embodiment, the aggregation ECU 30 includes the plurality of computing modules 31, 32, . . . , 3*n* that respectively aggregate the time-series data to generate the aggregation results in different aggregation formats from each other. This enables useful information to be provided from the vehicle V to the management server 100 according to various needs of the management server 100 (developers and the like).

The aggregation processing module 30P acquires the new aggregation condition table (see FIG. 5) linked to the aggregation format requested by the developers and the like and including at least the aggregation item, the aggregation item attribute, the aggregation axis information, the computing cycle (aggregation cycle) and the aggregation precondition from the management server 100. Further, the aggregation processing module 30P links the new aggregation condition defined by the new aggregation condition table and the aggregation format, and stores them in the storage device 30M. In addition, the aggregation processing module 30P makes any one of the computing module 31, 32, . . . , 3*n* corresponding to the aggregation format from the management server 100 aggregate the time-series data in accordance with the new aggregation condition linked to the aggregation format (FIG. 4). This enables the applicable any one of the computing modules 31, 32, . . . , 3*n* to perform an appropriate aggregation process to obtain the useful aggregation result according to needs of the management server 100 (developers and the like).

In the above embodiment, the aggregation ECU 30 collects the data through the CAN communication from the ECUs 1, 2, 3, 4, . . . of the vehicle V that respectively acquire the data assigned thereto. The frame F of the CAN communication includes the data collection frame Ft in which the data received by the aggregation ECU 30 are stored, the diagnosis record frame Fd in which the data for the vehicle diagnosis and the like are stored, and the general-purpose frame Ff in which the arbitrary data are stored. The new aggregation condition defined by the new aggregation condition table includes the ID of the data to be stored in the frame F of the CAN communication, the ID of the data collection frame Ft, the diagnostic record frame Fd or the general-purpose frame Ff in which the data are to be stored, and the address in which the data are to be stored in the data collection frame Ft, the diagnostic record frame Fd or the general-purpose frame Ff. The ECUs 1, 2, 3, 4, respectively store the acquired data in the frame F of the CAN communication in accordance with the new aggregation condition from the management server 100. This makes it possible to flexibly change the data aggregated by the aggregation ECU 30 and the aggregation results according to the ever-changing needs of the management server 100 (developers and the like).

The aggregation conditions shown in FIG. 3 do not necessarily need to be stored in the storage device 30M at the manufacturing stage of the vehicle V. For example, the aggregation conditions specified by the external device may be stored sequentially in the storage device 30M after a delivery of the vehicle V to a user. The external device is not limited to the above management server 100 or the terminal 150 of the vehicle dealer or the vehicle maintenance shop. The external device may be a dedicated terminal not shown in the figure, which is connected to the in-vehicle communication device 20 by a wired or wireless communication for a failure diagnosis. The aggregation ECU 30 may be configured as a data logger that is mounted on the vehicle V and constantly records multiple data in a predetermined cycle. The function of the aggregation ECU 30 may be incorporated in any of the ECUs 1, 2, 3, 4, . . . . The vehicle V is not limited to the hybrid electric vehicle (HEV), but may be a vehicle powered only by an engine, or a battery electric vehicle (BEV, including a fuel cell vehicle (FCEV)).

As has been described above, the data collection device (30) of the present disclosure is mounted on the vehicle (V) and collects data on the state of the vehicle (V). The data collection device (30) is programmed to acquire the aggregation format of the data from the external device (100, 150) and aggregates the data collected from the vehicle (V) to generate the aggregation result in the aggregation format specified by the external device (100, 150). The data collection device (30) is programmed to send the aggregation result to the external device (100, 150).

The data collection device of the present disclosure aggregates the data collected from the vehicle to generate the aggregation result in the aggregation format specified by the external device and sends the aggregation result to the external device. This makes it possible to greatly reduce a volume of data of information sent from the vehicle to the external device, compared to the case where the data for obtaining the aggregation result are sent from the vehicle to the external device. Further, the external device does not need to aggregate the data from the vehicle (data collection device), and the aggregation result can basically be utilized as it is. As a result, the data collection device of the present disclosure enables useful information to be provided from the vehicle to the external device according to needs of the external device while reducing a communication load and a processing burden of the external device.

The data collection device (30) may include the plurality of computing modules (31, 32, . . . , 3n) programmed to respectively aggregate the data to generate the aggregation results in different aggregation formats from each other.

This enables useful information to be provided from the vehicle to the external device according to various needs of the external device.

The data collection device (30) may be programmed to acquire the aggregation condition including at least the aggregation item, the aggregation item attribute, the aggregation axis information, the aggregation cycle, and the aggregation precondition from the external device (100, 150) in addition to the aggregation format. The data collection device (30) may be programmed to link the acquired aggregation format and the aggregation condition and stores them in the storage device (30M). The data collection device (30) may be programmed to make the computing module (31, 32, . . . , 3n) corresponding to the aggregation format from the external device (100, 150) aggregate data in accordance with the aggregation condition linked to the aggregation format.

This enables the applicable computing module to perform an appropriate aggregation process to obtain the useful aggregation result according to needs of the external device.

The data collection device (30) may be is programmed to collect the data by the CAN communication from the plurality of devices (1, 2, 3, 4, of the vehicle (V) that respectively acquire the data assigned thereto. A frame (F) of the CAN communication may include the data collection frame (Ft) in which data received by the data collection device (30) are stored, the diagnosis record frame (Fd) in which data for the vehicle diagnosis are stored, and the general-purpose frame (Ff) in which arbitrary data are stored. The aggregation condition includes the ID of the data to be stored in the frame (F) of the CAN communication, the ID of the data collection frame (Ft), the diagnostic record frame (Fd) or the general-purpose frame (Ff) in which the data are to be stored, and the address in which the data are to be stored in the data collection frame (Ft), the diagnostic record frame (Fd) or the general-purpose frame (Ff). The plurality of devices (1, 2, 3, 4, may be programmed to respectively store the acquired data in the frame (F) of the CAN communication in accordance with the aggregation condition from the external device (100, 150).

This makes it possible to flexibly change the data aggregated by the data collection device and the aggregation results according to the ever-changing needs of the external device side.

The external device may be at least one of the management server (100) programmed that acquires and manages information from the data collection device (30) via the communication device (20) mounted on the vehicle (V), and the terminal (150) that is connected to the data collection device (30) via the communication device (20) for the failure diagnosis of the vehicle (V).

A data collection method of the present disclosure collects data on a state of a vehicle (V). The method includes: sending the aggregation format of the data from the external device (100, 150) to the vehicle (v); aggregating the data collected from the vehicle (V) on the vehicle (v) side to generate an aggregation result in the aggregation format specified by the external device (100, 150); and sending the aggregation result from the vehicle (V) to the external device (100, 150).

The method enables useful information to be provided from the vehicle to the external device according to needs of the external device while reducing a communication load and a processing burden of the external device.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the manufacturing industry of the vehicle.

The invention claimed is:

1. A data collection device that is mounted on a vehicle and collects data on a state of the vehicle,
   wherein the data collection device is programmed to acquire an aggregation format of the data from an external device and aggregate the data collected from the vehicle to generate an aggregation result in the aggregation format specified by the external device, and wherein the data collection device is programmed to send the aggregation result to the external device,
   wherein the data collection device includes a plurality of computing modules programmed to respectively aggregate the data to generate aggregation results in different aggregation formats from each other,
   wherein the data collection device is programmed to acquire an aggregation condition including at least an aggregation item, an aggregation item attribute, an aggregation axis information, an aggregation cycle, and an aggregation precondition from the external device in addition to the aggregation format,
   wherein the data collection device is programmed to link the acquired aggregation format and the aggregation condition and store them in a storage device, and
   wherein the data collection device is programmed to make a computing module corresponding to the aggregation format from the external device aggregate data in accordance with the aggregation condition linked to the aggregation format.

2. The data collection device according to claim 1,
   wherein the data collection device is programmed to collect the data by a controller area network (CAN) communication from a plurality of devices of the vehicle that respectively acquire the data assigned thereto, wherein a frame of the CAN communication includes a data collection frame in which data received by the data collection device are stored, a diagnostic record frame in which data for a vehicle diagnosis are stored, and a general-purpose frame in which arbitrary data are stored, wherein the aggregation condition includes an ID of the data to be stored in the frame of the CAN communication, an ID of the data collection frame, the diagnostic record frame or the general-purpose frame in which the data are to be stored, and an address in which the data are to be stored in the data collection frame, the diagnostic record frame or the general-purpose frame, and wherein the plurality of devices is programmed to respectively store the acquired data in the frame of the CAN communication in accordance with the aggregation condition from the external device.

3. The data collection device according to claim 1, wherein the external device is at least one of a management server programmed to acquire and manage information from the data collection device via a communication device mounted on the vehicle, and a terminal that is connected to the data collection device via the communication device for a failure diagnosis of the vehicle.

4. A data collection method collecting data on a state of a vehicle, the method comprising:

sending an aggregation format of the data from an external device to the vehicle;

aggregating the data collected from the vehicle on the vehicle side to generate an aggregation result in the aggregation format specified by the external device, wherein a data collection device includes a plurality of computing modules programmed to respectively aggregate the data to generate aggregation results in different aggregation formats from each other;

acquiring an aggregation condition including at least an aggregation item, an aggregation item attribute, an aggregation axis information, an aggregation cycle, and an aggregation precondition from the external device in addition to the aggregation format, linking the acquired aggregation format and the aggregation condition and storing them in a storage device;

making a computing module corresponding to the aggregation format from the external device aggregate data in accordance with the aggregation condition linked to the aggregation format; and sending the aggregation result from the vehicle to the external device.

* * * * *